D. KEMBLE.
WIND WHEEL.
APPLICATION FILED AUG. 17, 1914.
1,178,729.
Patented Apr. 11, 1916.
2 SHEETS—SHEET 1.
Fig. 1.
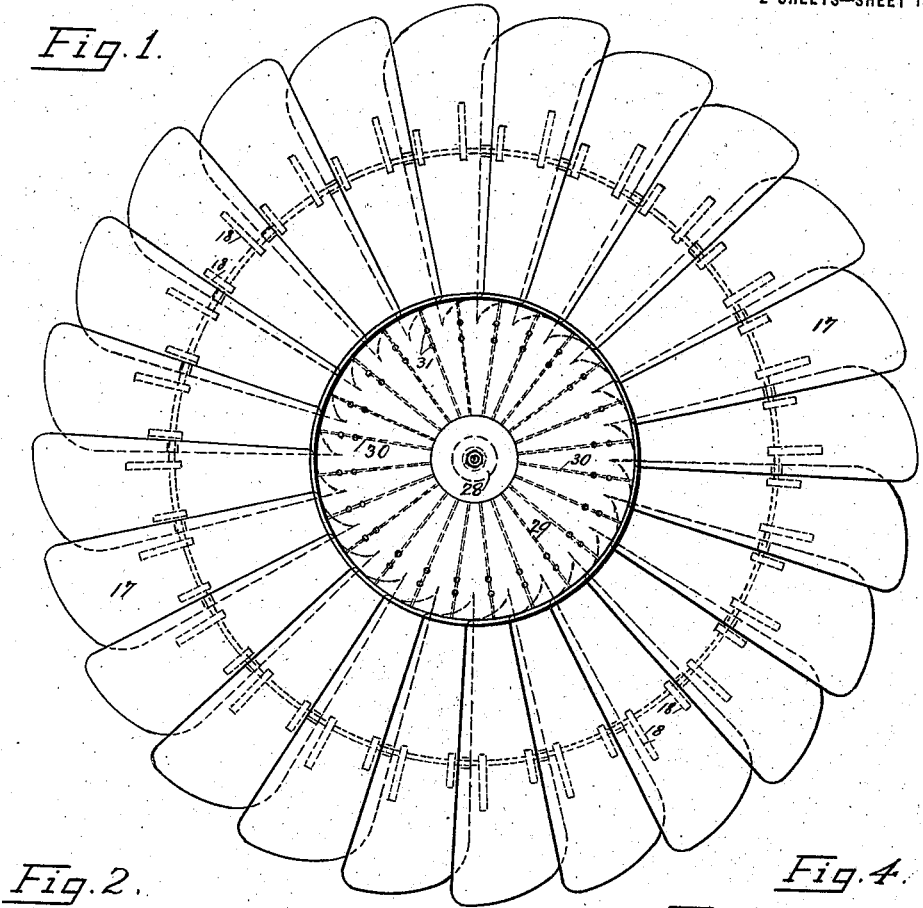
Fig. 2.
Fig. 3.
Fig. 4.
Fig. 5.
Fig. 6.
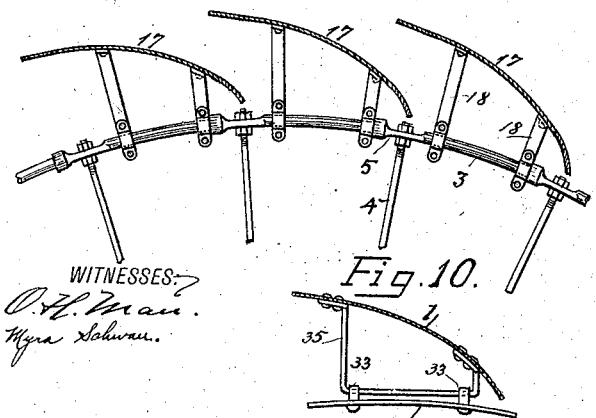
Fig. 10.
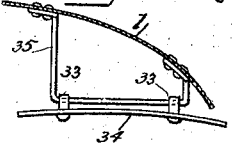
WITNESSES:
O. H. Man.
Myra Schwan.
INVENTOR
Duston Kemble
BY
Fisher & Moser
ATTORNEY
THE COLUMBIA PLANOGRAPH CO., WASHINGTON, D. C.

D. KEMBLE.
WIND WHEEL.
APPLICATION FILED AUG. 17, 1914.
1,178,729.
Patented Apr. 11, 1916.
2 SHEETS—SHEET 2.
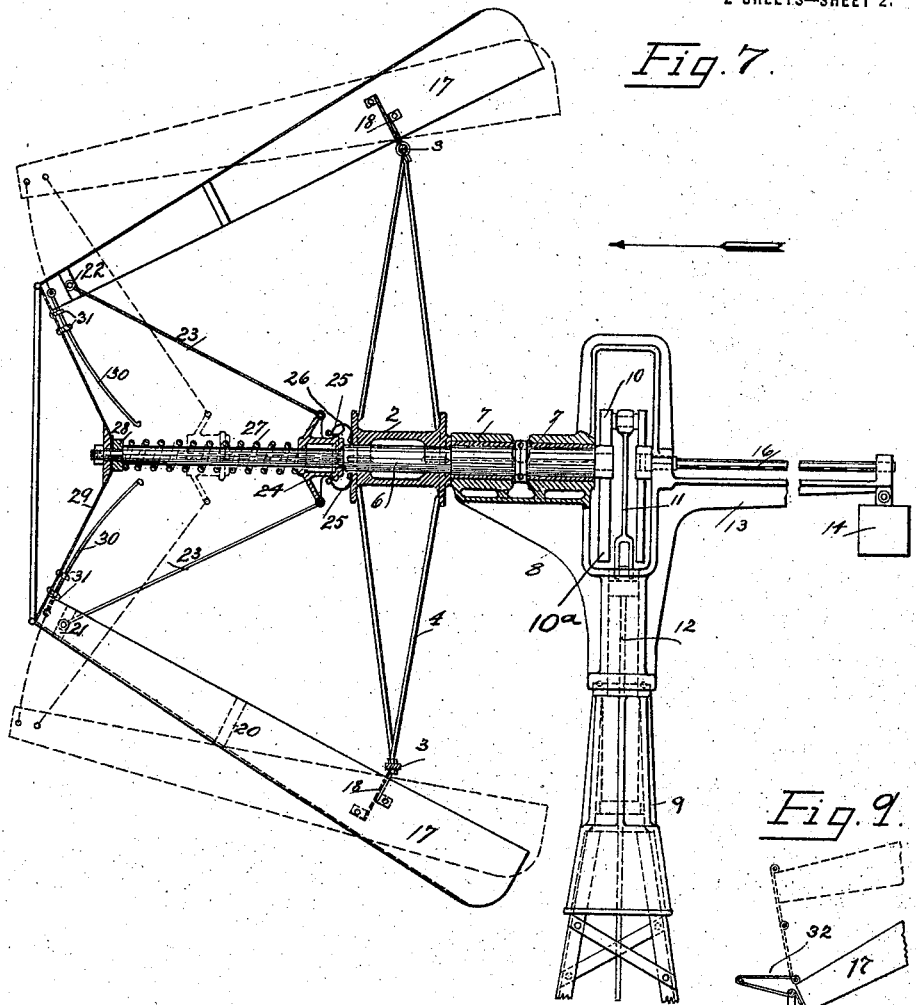
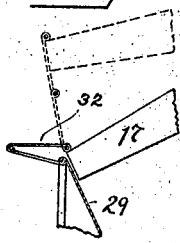
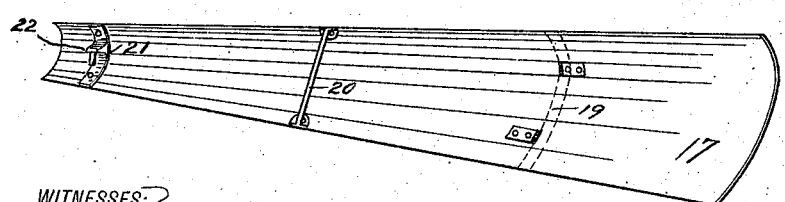
WITNESSES:
INVENTOR
Duston Kemble
BY
Fisher & Moert
ATTORNEY

UNITED STATES PATENT OFFICE.

DUSTON KEMBLE, OF LAKEWOOD, OHIO.

WIND-WHEEL.

1,178,729.

Specification of Letters Patent.   Patented Apr. 11, 1916.

Application filed August 17, 1914.   Serial No. 857,033.

*To all whom it may concern:*

Be it known that I, DUSTON KEMBLE, a citizen of the United States, residing at Lakewood, in the county of Cuyahoga and State of Ohio, have invented certain new and useful Improvements in Wind-Wheels, of which the following is a specification.

My invention comprises an improved wind wheel of conical form, the object of which is to yield a greater output of power for a given diameter than the ordinary type of wind wheel by its capacity for utilizing a larger part of the energy in the given wind area.

Other objects are to provide a wind wheel that is lighter in construction than in other open front wheels having deflectors by reducing the size of the deflector; to provide a wind wheel with sufficient torque relatively to its total power that it will be adaptable to a direct pump action and permit the use of a device for controlling the length of pump stroke; to provide a wind wheel that is well adapted to be blown open during the prevalence of excessively high winds and thus to escape the usual danger of damage or wrecking by such winds; to provide a wind wheel which combines the advantages of both the radial vaned and axial vaned types of such wheels in structure, speed, power and average total output; to provide a means of opening and closing the hinged vanes of a wind wheel according to variations in the velocity of the prevailing wind without disturbing the symmetry and balance of the vanes relative to each other in the circle; and to provide a means of holding and maintaining in a normal position the inner ends of the hinged vanes of a wind wheel so that they will not be twisted or bent away from their place in the circle when opened by a strong wind.

In the accompanying drawings, Figure 1 is a rear view of my improved wheel. Fig. 2 is a plan view or elevation of a portion of the wheel band, and Fig. 3 is a front view of the said band with several vanes mounted thereon, the vanes being shown in cross section. Figs. 4 and 5 are detail views of the pivot straps for the vanes. Fig. 6 is a cross section of a few vanes showing the link connections at their smaller end. Fig. 7, Sheet 2, is a central section longitudinally of the wind wheel. Fig. 8 is a perspective view of a single vane. Figs. 9 and 10 are detail views of modified portions of the wind wheel.

The wind wheel consists of a hub 2, a wrought-iron tire or band 3, and wire spokes 4 secured by nuts at the flattened portions 5 of the band. The hub is keyed or fixed upon a shaft 6 which is mounted in suitable bearings 7 of a strong but light frame 8 capable of revolving on a vertical axis at the top of a tower 9 or other suitable support. A crank 10 at one end of shaft 6 with the counter-weight $10^a$ to balance the pump rod and its connecting parts and a pitman 11 afford one form of operating connection for the pump rod 12, and a forwardly-projecting arm 13 of frame 8 supports a weight 14 to counter-balance the wheel at the opposite side of said frame. A rod 16 extends parallel with said arm and is affixed thereto and to the frame opposite the crank shaft to brace and strengthen the arm, and one side arm of the crank is free to revolve on an inner projecting end of the rod.

The vanes 17 of the wind wheel are independently pivoted or hinged by straps 18 to the round band 3, and the series of vanes are arranged normally like a frustum of a cone with each vane hinged to the band at a point approximately one-third of its length from its outer extremity. The inclination of the vanes longitudinally thereof to the axis of revolution is at an angle of less than forty-five degrees preferably, and each vane is of greater length than the radius of the area circumpassed by the forward ends of said vanes. Each vane is paracentric transversely and tapers in width longitudinally, and each vane is set also tangentially of the wheel. The material for the vanes may be of thin sheet metal, and ribs of heavier strap iron may be employed to stiffen the vanes, in that case, and such ribs or pieces may have the same curvature or form of the vane as shown by the dotted lines 18, see Fig. 8, or be straight as represented by the piece 20, in the same figure. The rear or smaller ends of each vane may be stiffened by a rib or piece 21 having an ear or pivot lug 22 to which a link 23 is connected. The opposite end of said link is hinged to a slidable collar 24 which is held in a normally retired position adjacent the end of hub 2 in the shaft by bow springs 25 affixed to the hub and in gripping relation with an annular shoulder 26 on the collar. This arrangement of parts permits the inner ends of the vanes to swing open under excessive and dangerous wind pressure and at the same time prevents the vanes from twisting out of shape and symmetry; also all the vanes operate in unison and have the same relative opening and closing movement. In addition to the detent device described, the vanes are checked and cushioned in their opening movement by the coiled spring 27 which is sleeved on the shaft between the slidable collar 24 and the washer 28 at the front of the deflector 29. This deflector is preferably conical and fastened to the end of shaft 6, and is relatively small in diameter and set close to the smaller ends of the vanes when in their normal operating position. A curved rod 30 attached to each vane and slidably engaged with eye members 31 on the deflector 29 holds the vanes from twisting or becoming displaced at their rear ends and also limits the outward swinging movements of the vanes. In lieu of this arrangement, I may use a hinge connection 32 as shown in Fig. 9. An equivalent to the hinge straps 18 is also shown in Fig. 10, Sheet 1, wherein studs or lugs 33 are riveted on a flat band 34, and a loop 35 is riveted at its ends to the vane and pivotally engaged with said studs or lugs.

Other modifications might also be made in the structure as described without departing from the spirit and scope of the invention and following claims.

What I claim is:

1. In a wind wheel, a shaft and a circle of vanes of tapering and paracentric form set on tangential lines longitudinally at an acute angle relatively to the shaft.

2. In a wind wheel, a shaft and a circle of vanes set tangentially of the wheel with their edges in juxtaposition radially of the wheel at an angle of less than forty-five degrees with the axis of revolution, each vane having a greater length than the radius of the area circumpassed by the windward ends of the vanes.

3. In a wind wheel, a shaft having a wheel mounted thereon and a set of curved vanes hinged at their forward ends on said wheel to move radially outward at their rearward ends; and inclined longitudinally and transversely at an acute angle to said shaft.

4. In a wind wheel, a shaft having a wheel and a deflector mounted thereon and a series of vanes hinged to said wheel and extending longitudinally to said deflector at an angle to said shaft and with their rear end edges in close juxtaposition to the rim of said deflector under normal conditions.

5. In a wind wheel, a shaft having wire spokes and a wheel rim and a circle of vanes arranged like a frustum of a cone and hinged at their front ends upon said wheel rim, said vanes being tapered and of paracentric form.

6. In a wind wheel, a shaft having a circular deflector mounted thereon and a wheel mounted at the front of said deflector, a circle of vanes hinged to said wheel and arranged like a frustum of a cone with the rear end edge of each vane in juxtaposition to the rim of said deflector, and means to hold said vanes from swinging outward under normal wind pressures.

7. In a wind wheel, a circle of vanes longitudinally arranged at an angle acute to their axis of revolution under normal conditions and hinged to swing outward at their rear ends, and means to guide said vanes independently on radial lines at their rear ends.

8. In a wind wheel, a shaft and a circle of vanes longitudinally arranged at an acute angle to said shaft and hinged to swing outward at their rear ends, and detaining guide rods for each vane at its rear end to hold the said vanes from swinging outward under normal wind pressures.

9. In a wind wheel, a shaft and a circle of vanes set at an acute angle to the axis of revolution and hinged to swing outward at their rear ends, and separate guide members for the end of each vane to relieve the twisting strains to which the vanes are subjected when in rotation and under wind pressure.

10. In a wind wheel, a shaft, a wheel and a circle of vanes hinged thereto and extending rearwardly at an inclination to said shaft, a slidable collar on said shaft having link connections with said vanes, and a spring gripping device for said collar.

11. In a wind wheel, a shaft, a wheel and a series of vanes hinged to said wheel at an acute angle to said shaft, a conical deflector at the end of said shaft adjacent the rear ends of said vanes, a slidable collar on said shaft and links connected therewith and with said vanes, and a cushioning spring sleeved on said shaft between said deflector and collar.

12. In a wind wheel, a shaft, a hub on said shaft, an annular band, wire spokes secured to said hub and band, a series of vanes having hinged connections with said band, a deflector mounted on said shaft in close juxtaposition to the inner end edges of said vanes and means to limit the outward swinging movement of said vanes on their hinged connections relatively to said deflector.

13. In a wind wheel, a series of vanes normally inclined toward the windward side at an angle of less than forty five degrees with the axis of revolution and each vane having a greater length than the radius of the area thus inclosed by the windward ends of the said vanes and arranged successively in overlapping relations at their longitudinal edges.

14. In a wind wheel, a deflecting diaphragm and a series of vanes set normally in an inclined relation close thereto at their inner ends and hinged so that said inner ends shall swing away from said diaphragm radially when rotating at high velocity, thus making an open space for the wind to pass through the wheel without expending its normal force upon the vanes.

15. In a wind wheel, a central diaphragm and a circle of vanes arranged about said diaphragm and normally inclined in respect thereto and provided with an inner mounting having hinge connections for said vanes circumferentially thereof, a wheel shaft, a slidable sleeve on said shaft, and brace links connecting the inner ends of the vanes with said slidable sleeve, and a coiled spring and separate spring detent device to hold the vanes in their normal position except when overcome by wind pressure and centrifugal force.

In testimony whereof I affix my signature in presence of two witnesses.

DUSTON KEMBLE.

Witnesses:
F. J. GREER,
F. C. HARROLD.

Copies of this patent may be obtained for five cents each, by addressing the "Commissioner of Patents, Washington, D. C."